United States Patent [19]

Harrington et al.

[11] Patent Number: 4,782,708
[45] Date of Patent: Nov. 8, 1988

[54] THERMOCOUPLE SENSORS

[75] Inventors: Charles R. Harrington; Joseph P. Heremans, both of Troy, Mich.

[73] Assignee: General Motors Corporation, Detroit, Mich.

[21] Appl. No.: 90,012

[22] Filed: Aug. 27, 1987

[51] Int. Cl.[4] ............... G01F 1/68; G01P 5/10; G01P 5/18
[52] U.S. Cl. ..................... 73/861.05; 73/204.24
[58] Field of Search ............... 73/861.05, 204; 136/240

[56] References Cited

U.S. PATENT DOCUMENTS

| 1,996,943 | 4/1935 | Wile | 73/204 |
| 3,136,134 | 6/1964 | Smith | 136/240 |
| 4,561,303 | 12/1985 | McCarthy | 73/204 |
| 4,576,050 | 3/1986 | Lambert | 73/861.05 |

Primary Examiner—Herbert Goldstein
Attorney, Agent, or Firm—Robert J. Wallace

[57] ABSTRACT

An air flow sensor which employs a thermocouple using a film of bismuth$_{0.92}$ antimony$_{0.08}$ to form junctions with gold, platinum or nickel strips and a resistive strip heater of the same metal.

8 Claims, 1 Drawing Sheet

«4,782,708»

THERMOCOUPLE SENSORS

FIELD OF THE INVENTION

This invention relates to mass air flow sensors which use a thermocouple as a temperature sensing element in detecting the velocity of the air flow.

BACKGROUND OF THE INVENTION

An important class of mass air flow sensors is based on the measurement either of the amount or the time of flight of heat transported by the air flow between a resistive heater and a temperature difference detector formed by a thermocouple. An example of such a mass air flow sensor is described in U.S. Pat. No. 4,576,050.

In sensors of this kind, a suitable common substrate supports both a resistive strip heater and a thermoelectric detector or thermocouple spaced apart a fixed distance in a parallel relationship. An oscillator supplies oscillating current to the strip heater to create similar temperature variations in the heater that are used to heat correspondingly the air flowing past the strip normal to its longitudinal axis for continued flow past the thermoelectric detector.

In particular, the detector generally comprises a thin continuous film of material, having a high thermoelectric power and low resistivity, that is positioned between a pair of elongated parallel strips to form a pair of spaced elongated junctions that form the thermocouple of the detector. Temperature differences between the two junctions give rise to a voltage which is a measure of the difference. A differential amplifier having its inputs coupled to the two strips will produce an output signal when a temperature difference exists. Any of a variety of known techniques can be used to separate out this output signal. Typically, as described in the aforementioned patent, this involves filtering the output signal to pass a frequency twice that of the frequency of the oscillator since each sine wave cycle of the oscillator will produce two heat pulses in the strip heater and give rise to two output pulses. The filtered output signal and a signal from the oscillator are then fed to a circuit which is sensitive to the time differential or phase difference between the oscillator current and the detector output signal. This time differential or phase difference will be a measure of the velocity of the air flow past the two junctions of the detector.

For use in sensors of this kind, high and stable sensitivity is needed for the detector as well as compact size. In particular, there is needed a detector which in size and power is readily compatible with silicon integrated circuitry since such circuitry advantageously is used in conjunction with the detector to make a complete sensor system.

SUMMARY OF THE INVENTION

In accordance with the present invention, the mass air flow sensor system of the kind described is improved by the inclusion of a novel detector which uses a narrow gap semiconductor as the continuous film material of the thermocouple. Moreover, to facilitate manufacture, the strips used in forming the pair of opposed thermoelectric junctions with the film material are advantageously of the same metal as that used for the strip heater. In the preferred form, such a detector uses a narrow band-gap bismuth antimony alloy, most advantageously $Bi_{0.92}Sb_{0.08}$ as the film material and either gold, platinum or nickel as the metal for both the resistive heater strip and the two junction strips.

The invention will be better understood from the following more detailed description taken in conjunction with the accompanying drawings.

DETAILED DESCRIPTION OF THE INVENTION

Figure 1:
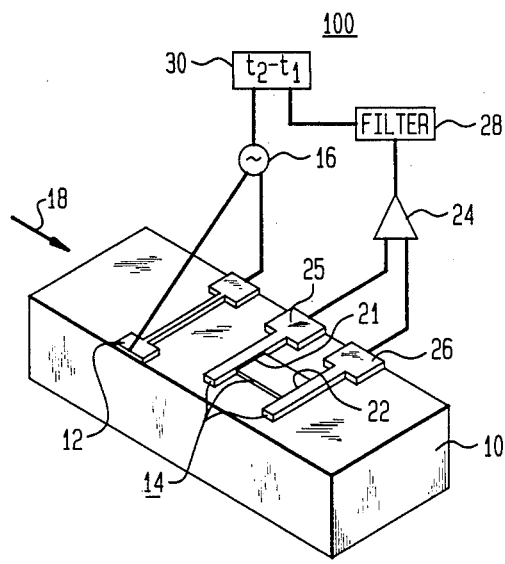
FIG. 1 shows, in perspective and in schematic form, an air flow sensor system of the kind described in the above-mentioned patent as illustrative of systems in which the novel sensor of the invention may be used.

FIG. 1 shows the principal elements of a mass air flow sensor system 100 of the kind that the present invention seeks to improve and that is described in detail in the earlier mentioned patent.

It includes a substrate 10 which supports a strip heater 12 and a thermoelectric detector 14 of the kind discussed, including a thermocouple formed by a pair of spaced junctions. The oscillator 16 supplies an oscillating current of appropriate frequency to the strip heater 12 for creating therein a thermal wave varying at twice the oscillator frequency for heating correspondingly the mass of air flowing therepast indicated by the arrow 18. The heated air mass in turn flows past the detector 14 whose thermocouple includes a pair of thermoelectric junctions 21 and 22 spaced apart along the path of air flow a prescribed distance. A differential amplifier 24 has its two inputs connected to the two contact pads 25 and 26 at ends of the two metal strips forming the junctions 21 and 22. The amplifier 24 supplies the filter 28 whose output is supplied to the timing circuit 30 to which is also supplied a sample of the output of the oscillator 16. The output of the oscillator serves as a measure of the transit time of the heated air past the distance between the two junctions of the detector and this in turn is a measure of the velocity of the air flowing past the sensor, the quantity being measured. For a more detailed description, reference can be had to the patent.

Figure 2:
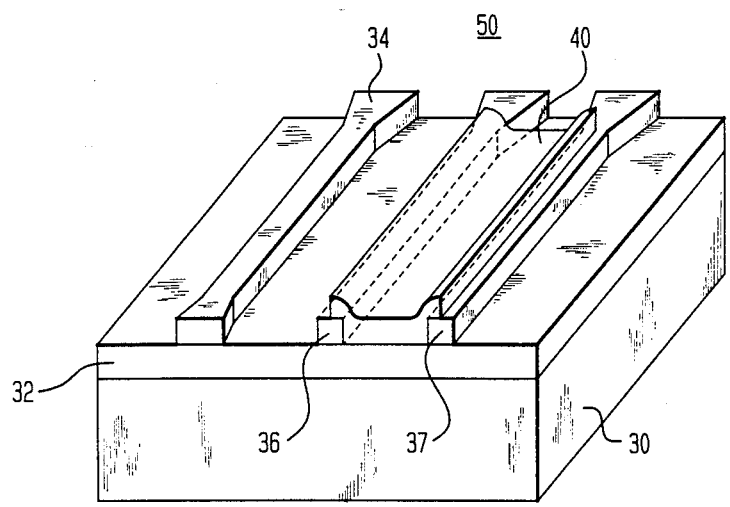
FIG. 2 shows, also in perspective and in schematic form, a sensor for incorporation in the system of FIG. 1 in accordance with the invention.

FIG. 2 shows in more detail a detector 50 in accordance with the invention and suitable for use as the detector 14 in the sensor system shown in FIG. 1. It includes a rugged substrate 30, advantageously of thermally conductive silicon, over which is disposed a thin layer 32 of a thermally insulating material, such as polyimide. The use of thermally conductive silicon for the main support reduces the static temperature of the detector, thereby desirably allowing the static temperature to be kept low. The polyimide film 32 provides a thermal and electrical insulator to insure along the substrate surface low thermal diffusivity relative to the air whose temperature is to be measured. Moreover, the choice of silicon as the substrate makes feasible forming in the substrate portions of the integrated circuitry used in the system.

Disposed over the upper surface of the film 32 is the resistive strip heater 34 which extends longitudinally across the surface and is provided with enlarged areas at each end to serve as conductive pads between which will be connected leads to an oscillator which supplies the heating power, as is shown in FIG. 1. Also supported on the film 32 are a pair of identical strips 36 and 37 that extend longitudinally across the film 32, parallel to one another and to the heater strip 34. Overlying each of the strips 36 and 37 is a continuous film 40 of a narrow-gap semiconductor material that cooperates with the material of the strips 36 and 37 to form a pair of elongated junctions that form a thermocouple in which a temperature difference between the two junctions gives rise to a corresponding potential difference. An end portion of each strip 36 and 37 is enlarged and left exposed to serve as a conductive pad to which a separate input lead of a differential amplifier may be readily connected, as is shown in FIG. 1.

In accordance with the present invention, the film 40 is of a semiconductor or semimetal with an energy band gap less than 25 millielectron volts, and advantageously of bismuth-antimony alloy $Bi_{1-x}Sb_x$ in which X is between 0.01 and 0.15 and preferably about 0.08. By the use of such an alloy, any p-n junction or Schottky barriers that may form are easily overcome by the thermal activation of the charge carriers, since as is known, their direct energy band-gap is no greater than about twenty millielectron volts. Moreover, the strips 36 and 37 which form the thermally sensitive junctions with the film are preferably of gold or platinum. Similarly, other metals, for example nickel, may be used. Junctions of this kind are found to exhibit high thermoelectric powers with good thermal stability and suitably low impedances.

A detector of the kind shown in FIG. 2, was fabricated as follows. There was first prepared the silicon substrate 30 of sufficient thickness to be relatively rugged and over this there was deposited for thermal insulation the layer 32 of polyimide about 20 microns thick cured at about 400° Centigrade. Then a layer of gold, platinum or nickel about 2500 Angstroms is formed over layer 32 and then patterned photolithographically to leave the resistive heater strip 34 and the two contact strips 36 and 37 along with appropriate enlarged end portions as shown to serve as conductor pads. Various ways are known for forming the layers, including sputtering, evaporation or deposition from metallorganic solutions. The spacing between heater strip 34 and the first contact strip 36 was about 50 microns and the spacing between the two contact strips was between 300 and 1200 microns. The heater strip was about 50 microns wide and about 250 to 1000 microns long. The contact strips were typically 25 microns wide and about four hundred microns long.

Then the substrate was masked to leave exposed only where the bismuth-antimony film was desired and the masked substrate was then covered with a layer of $bismuth_{0.92}$ $antimony_{0.08}$ deposited to a thickness of 4000+ or −3000 Angstroms. The layer was deposited by thermal evaporation under 10-6 Torr vacuum with the bismuth-antimony alloy in a shuttered oven at 750°+ or −50° Centigrade. Then the mask was selectively dissolved and its overlying bismuth-antimony portion lifted off with the removal of the mask.

Alternatively, the bismuth-antimony could have been blanket deposited over an unmasked substrate, and then patterned to leave the desired film over the junction metal strips.

With a thermocouple of the kind described, values of thermoelectric power of about 140 microvolts per degree Kelvin were achieved with satisfactory stability.

It is also feasible to form thermocouple elements in which the bismuth-antimony is blanket-deposited first and then photolithographically patterned to leave the desired film. Then a lift-off masking layer is deposited over the substrate and patterned to leave exposed only portions where the nickel or platinum electrodes and resistance heater strip are desired. The nickel or platinum metal is then sputtered over the masked substrate and when the masking layer is etched away, there is simultaneously lifted off any overlying metal.

Alternatively, after the gold, platinum or nickel elements have been formed there is deposited thereover a blanket film of bismuth-antimony. The desired film area is then masked by photolithographic techniques and the unmasked bismuth-antimony selectively removed by an etchant which does not attack the metal, such as an aqueous mixture of hydrogen peroxide and sulphuric acid.

It is to be understood that the specific embodiments described are merely illustrative of the invention. Various modifications, for example in the dimensions involved or in the manner of manufacture, can be made without departing from the spirit of the invention.

Moreover, detectors of the kind described can be incorporated in other forms of mass air flow sensor systems. In particular, in the aforementioned patent, there is described a sensor system in which two detectors are included along the air flow whose outputs are combined in ways to achieve a particular advantage, such as reduced sensitivity to linear temperature gradients or compensation for particular conditions, for example, by use of a pair of detectors of the kind described positioned side by side across the air stream with their outputs connected in series between the two differential amplifier inputs.

Alternatively, a pair of detectors of the kind described can be used to provide a zero reference for a system in which the two detectors are positioned appropriately and oriented 90° with respect to one another in the air stream, the output of each being supplied to its own differential amplifier. A timing circuit is used to compare the outputs of the two amplifiers to produce a signal representing the resultant phase shift or time shift that is a measure of the air flow compensated for the effects of air temperature, pressure, humidity and surface conditions.

The embodiments of the invention in which an exclusive property or privilege is claimed are defined as follows:

1. A sensor for use in an air flow sensor system which comprises:
    means forming a common substrate;
    means forming a resistive strip heater of a first metal supported on said substrate and adapted to be supplied with heating power; and
    means for forming a pair of thermocouple junctions including a pair of spaced junction elements of the first metal and, extending between the pair of junction elements and forming junctions therewith, a continuous film of $Bi_{1-x}$ $Sb_{bx}$ where X=0.01 to 0.15.
2. The sensor of claim 1 in which X=0.08.
3. The sensor of claim 1 in which the first metal is taken from the group consisting of nickel, platinum and gold.
4. The sensor of claim 3 in which X=0.08.
5. The sensor of claim 1 in which the strip heater means and each of the spaced junction elements lie in a plane whereby they may be formed as separate portions of a common layer.

6. The sensor of claim 1 in which said resistive strip heater and said pair of spaced junction elements lie in a plane whereby they may be formed from discrete portions of a common metal layer overlying the substrate, and the substrate comprises a thermally conductive support over which lies a layer of a thermal insulator.

7. The sensor of claim 6 in which the continuous film extends between and overlaps the two spaced junction elements.

8. The sensor of claim 6 in which the metal of the common layer is taken from the group consisting of nickel, platinum and gold, the thermally conductive support is of silicon and the insulator is a polyimide layer.

* * * * *